US011168217B2

(12) United States Patent
Verspaille et al.

(10) Patent No.: US 11,168,217 B2
(45) Date of Patent: Nov. 9, 2021

(54) COATED BISMUTH OXY HALIDE-BASED PIGMENT

(71) Applicant: CAPPELLE PIGMENTS NV, Menen (BE)

(72) Inventors: Greta Verspaille, Menen (BE); Jürgen D'haeveloose, Menen (BE); Vincent Devreux, Menen (BE); Emmanuelle Clabaux, Menen (BE)

(73) Assignee: Ferro Corporation, Mayfield Heights, OH (US)

( * ) Notice: Subject to any disclaimer, the term of this patent is extended or adjusted under 35 U.S.C. 154(b) by 130 days.

(21) Appl. No.: 16/061,672

(22) PCT Filed: Dec. 13, 2016

(86) PCT No.: PCT/EP2016/080808
§ 371 (c)(1),
(2) Date: Jun. 13, 2018

(87) PCT Pub. No.: WO2017/102735
PCT Pub. Date: Jun. 22, 2017

(65) Prior Publication Data
US 2018/0362771 A1    Dec. 20, 2018

(30) Foreign Application Priority Data

Dec. 14, 2015 (EP) .................... 15199898

(51) Int. Cl.
| C09C 1/00 | (2006.01) |
| C09D 7/62 | (2018.01) |
| C09D 7/48 | (2018.01) |
| C08K 9/04 | (2006.01) |
| C09D 177/00 | (2006.01) |
| C08K 9/12 | (2006.01) |

(52) U.S. Cl.
CPC .............. *C09C 1/0006* (2013.01); *C08K 9/04* (2013.01); *C08K 9/12* (2013.01); *C09C 1/0015* (2013.01); *C09D 7/48* (2018.01); *C09D 7/62* (2018.01); *C09D 177/00* (2013.01); *C09C 2200/1087* (2013.01); *C09C 2220/103* (2013.01)

(58) Field of Classification Search
CPC .. C08L 77/00; C08K 9/04; C08K 9/12; C09C 1/0006; C09C 1/0015; C09C 2200/1087; C09C 2220/103; C09D 177/00; C09D 7/48; C09D 7/62
See application file for complete search history.

(56) References Cited

U.S. PATENT DOCUMENTS

| 2,974,053 | A | 3/1961 | Suchow |
| 4,937,063 | A | 6/1990 | Sullivan |
| 5,149,369 | A | 9/1992 | Eberts et al. |
| 5,399,335 | A | 3/1995 | Sullivan |
| 6,458,197 | B1 | 10/2002 | Vermoortele et al. |
| 6,464,772 | B1 | 10/2002 | Vermoortele et al. |
| 6,680,121 | B2 | 1/2004 | Sakoske et al. |
| 7,517,403 | B2 | 4/2009 | Müller et al. |
| 8,461,229 | B2 | 6/2013 | Ruiz Gomez et al. |
| 2005/0252417 | A1* | 11/2005 | Carsten ................. C09C 1/0015 106/415 |
| 2006/0155007 | A1 | 7/2006 | Huber |
| 2008/0092778 | A1 | 4/2008 | Bauer et al. |
| 2016/0251492 | A1 | 9/2016 | Kniess et al. |

FOREIGN PATENT DOCUMENTS

| EP | 2584009 A1 | 4/2013 |
| EP | 3181643 A1 | 6/2017 |

OTHER PUBLICATIONS

International Search Report for corresponding PCT/EP2016/080808 dated Feb. 2, 2017, two pages.

\* cited by examiner

*Primary Examiner* — Shuangyi Abu Ali
(74) *Attorney, Agent, or Firm* — Rankin, Hill & Clark LLP; Christopher Jan Korff

(57) ABSTRACT

The present invention is directed to a coated bismuth oxy halide-based pigment having a coating comprising an antioxidant, said antioxidant is being a phenol based, a phosphite or phosphonate based, or a thioether based stabilizer, and the coating comprising an inner coating and an outer coating, wherein the outer coating comprises the antioxidant, and wherein the inner coating comprises a first layer consisting of one or more salts, or one or more oxides, heteropolyacids, organic acids, sulphites, sulfides, sulfates, phosphates, pyrophosphates, polyphosphates, hydrates, carbonates, or a combination thereof, selected from the group of alkali-earth metals, metals, non-metals, transition metals or lanthanides. Further, the present invention is directed to a composition comprising a paint, a lacquer, an ink, a cosmetic, a resin, a plastisol or a polymer formulation, and such pigment. In addition, the present invention is directed to a method for manufacturing a coated bismuth oxy halide-based pigment, said method comprising the steps of: —providing a dispersion of a bismuth oxy halide-based pigment, —adding a dispersion of an antioxidant, —mixing and drying.

12 Claims, No Drawings

COATED BISMUTH OXY HALIDE-BASED PIGMENT

FIELD OF THE INVENTION

The present invention relates to a coated bismuth oxy halide-based pigment, to a composition comprising a paint, a lacquer, an ink, a cosmetic, a resin, or a plastic and such pigment, and to a method for manufacturing such coated bismuth oxy halide-based pigment.

BACKGROUND OF THE INVENTION

Mass-coloring of polymer processed at high temperatures, such as engineering plastics and in particular polyamide (PA) is usually carried out using so-called solvent dyes, which are soluble in the polyamide mass at high processing temperatures and which, besides having the requisite high heat resistance, also have adequate chemical stability with respect to, for example, the highly reductive medium of the polyamide melt. However, as stated in U.S. Pat. No. 8,461,229, soluble dyes generally have much poorer lightfastness, as compared with pigments.

With regards to organic pigments in the orange spectrum, there is only a limited availability of pigments which meet the high temperature thermal stability as required in the market of engineering plastics and in particular of polyamide or glass fiber reinforced polyamide. Most organic pigments (e.g. PO36, PO64, PO72) are not meeting the requirements as a result of pigment degradation.

With regards to inorganic pigments in the orange spectrum, a first type thereof are cerium sulfide based. These are high performing pigments in terms of thermal and chemical stability, light fastness and weathering stability in most thermoplastics, including polyolefines, acrylonitrilebutadiene styrene (ABS), polycarbonate (PC), and polymethylmethacrylate (PMMA). Due to the extreme conditions of temperature and shear forces in (glass fibre reinforced) polyamide engineering plastics, the chemical stability of the cerium sulfide pigments may be compromised and H2S emissions can be detected. In addition, they are also not recommended for durable polyvinylchloride (PVC) applications and fluoropolymers because discoloration is observed in the presence of HCl or HF formed at high temperatures. (Berte, J.-N. Cerium Pigments. In *High Performance Pigments*; Faulkner E. B., Schwartz, R. J., Eds.; Wiley-VCH Verlag GmbH & Co. KGaA, Weinheim, 2009; pp 27-40).

A second type of inorganic pigments in the orange spectrum are based on complexes of titanium, stannous and zinc oxides with different modifiers or dopants. Despite their high level of thermal and chemical resistance, these pigments cannot entirely satisfy the coloristic requirements for plastic coloring, especially not for the chroma value.

A third type of pigments is described in U.S. Pat. No. 6,458,197 B1 disclosing a modified BiVO4-based pigment being coated with a plurality of layers of inorganic compounds, the last layer being based on a zinc and boron compound. This pigment has a bright yellow to orange color and exhibits excellent resistance to heat in HDPE, but however not in PA. In addition, boric acid is subjected to stringent regulations as being a substance of very high concern due to its reprotoxicity, and is phased out on numerous applications. Also, the maximum allowable zinc content on pigment is regulated for food contact applications, such as the European Regulation EU/10/2011 and the Swiss Ordinance on Materials and Articles in Contact with Food SR 817.023.21. Specifically, the mentioned European regulation and the Swiss Ordinance limit the maximum allowable quantity of zinc to migrate from the packaging into the food to 25 mg Zn per kg food.

An example of a pigment attempting to overcome the above problems is described in EP2584009 (A1), wherein a coated bismuth-oxy iodide bromide is disclosed having a first coating containing silicon dioxide and one or more functionalized silane(s), and a second coating containing one or more functionalized silane(s). This pigment exhibits, besides high alkaline resistance for use in water based paints, good coloristic properties and moderate heat stability in polyolefins. However, it still lacks heat stability in mass-coloring of polyamide.

Considering the above, a first object of the present invention is to provide a pigment having improved and sufficient heat stability not only for mass coloring of polyolefins, but in particular also for mass coloring of polyamide.

Further, the present invention also aims to provide improved weathering and chemical stability in polyamide and fluoropolymers.

Another object of the present invention is providing a pigment with improved alkaline resistance for use in water based paints.

Further, a pigment in accordance with the present invention may offer clean shade and colour consistency in the orange spectrum.

In addition, a pigment in accordance with the present invention may be less suffering from decoloration in PVC.

Another benefit of a pigment of the present invention may be minimal warpage and improved shrinkage resistance in partially crystalline polymers (for example PE, PA) and minimal migration in LDPE and PVC.

In general it is an object of the present invention to provide a pigment that has the required characteristics for being used in a diversity of applications, such as water based applications and mass coloring of polyolefins and engineering plastics such as, but not limiting to, polyamides and PVC. It is clear that the manufacturing of such pigment may result in a significant reduction of overall pigment production cost as compared to the manufacturing of different specific pigment types for different applications.

SUMMARY OF THE INVENTION

The present invention is directed to a coated bismuth oxy halide-based pigment having a coating comprising an antioxidant, said antioxidant is being a phenol based, a phosphite or phosphonate based, or a thioether based stabilizer, and the coating comprising an inner coating and an outer coating, wherein the outer coating comprises the antioxidant, and wherein the inner coating comprises a first layer consisting of one or more salts, or one or more oxides, heteropolyacids, organic acids, sulphites, sulfides, sulfates, phosphates, pyrophosphates, polyphosphates, hydrates, carbonates, or a combination thereof, selected from the group of alkali-earth metals, metals, non-metals, transition metals or lanthanides.

Further, the present invention is directed to a composition comprising a paint, a lacquer, an ink, a cosmetic, a resin, a polymer, a plastisol, and such pigment.

In addition, the present invention is directed to a method for manufacturing a coated bismuth oxy halide-based pigment, said method comprising the steps of:
providing a dispersion of a bismuth oxy halide-based pigment.
adding a dispersion of an antioxidant,
mixing and drying.

DETAILED DESCRIPTION OF THE INVENTION

In a first embodiment according to the present invention, a coated bismuth oxy halide-based pigment having a coating comprising an antioxidant is provided, said antioxidant is being a phenol based, a phosphite or phosphonate based, or a thioether based stabilizer, and the coating comprising an inner coating and an outer coating, wherein the outer coating comprises the antioxidant, and wherein the inner coating comprises a first layer consisting of one or more salts, or one or more oxides, heteropolyacids, organic acids, sulphites, sulfides, sulfates, phosphates, pyrophosphates, polyphosphates, hydrates, carbonates, or a combination thereof, selected from the group of alkali-earth metals, metals, non-metals, transition metals or lanthanides.

By coating bismuth oxy halide-based pigment with an antioxidant, the coated pigment becomes compatible for a diversity of applications. The coated pigment provides sufficient heat resistance and color stability not only in mass coloring of polyolefins, but also in mass coloring of polyamide. Moreover it is still compatible with water based applications.

In addition, a coated pigment in accordance with the present invention may provide improved clean shade and colour consistency and may provide added value in terms of chroma in all applications that are dependent of the use of inorganic pigments, in particular for the orange spectrum.

In an embodiment of the present invention, the antioxidant may be a phenol based, a phosphite or phosphonite based, or a thioether based stabilizer, or a combination thereof.

The antioxidant may be an organic phosphite or phosphonite stabilizer, such as for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bisdodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl)-4,4'-biphenylene-diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2]dioxaphosphocin, bis(2,4-di-tert-butyl-6-methylphenyl) methyl phosphite, bis(2,4-di-tert-butyl-6-methylphenyl) ethyl phosphite.

Examples of phenol based stabilizer which may be suitable within the meaning of the present invention, may be alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenol, for example 2,6-di-nonyl-4-methylphenol, 2,4-dimethyl-6-(1'-methylundec-1'-yl)-phenol, 2,4-dimethyl-6-(1'-methylheptadec-1'-yl)-phenol, 2,4-dimethyl-6-(1'-methyltridec-1'-yl)phenol and mixtures thereof.

Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

Tocopherols, for example α-tocopherol, β-tocopherol, γ-tocopherol, ∂-tocopherol and mixtures thereof.

O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, trideyl 4-hydroxy-3,5-di-tert-butylbenzylmercaptoacetate tris (3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate.

Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl) malonate, didodecyl mercaptoethyl-2,2-bis(3,5-di-tert-butyl-4-hydroxybenzyl)malonate, di-[4-(1,1,3,3-tetramethylbutyl)phenyl] 2,2-bis(3,5-di-tert-butyl-4-hydroxybenzyl)malonate.

Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurat, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

Acylaminophenols, for example 4-hydroxylauranilide, 4-hydroxystearanilide, octyl N-(3,5-di-tert-butyl-4-hydroxyphenyl)carbamate.

Esters of β-(3,5-di-tert-butyl-4-hydroxyphenyl)propionic acid with mono- or polyhydric alcohols, e.g. with methanol, ethanol, n-octanol, i-octanol, octadecanol (for example Octadecyl 3-(3,5-di-tert-butyl-4-hydroxyphenyl)propionate (=Irganox$^R$ 1076)), 1,6-hexanediol, 1,9-nonanediol, ethylene glycol, 1,2-propanediol, neopentyl glycol, thiodiethylene glycol, diethylene glycol, triethylene glycol, pentaerythritol (for example Pentaerythritol tetrakis(3,5-di-tert-butyl-4-hydroxyhydrocinnamate) (=Irganox$^R$1010)), tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

Esters of β-(5-tert-butyl-4-hydroxy-3-methylphenyl)propionic acid with mono- or polyhydric alcohols, e.g.

with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)-oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

Amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

Examples of thioether based stabilizer which may be suitable within the meaning of the present invention, may be hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide, thiobis[2-(1,1-dimethylethyl)-5-methyl-4,1-phenylene] bis [3-(dodecylthio)propionate] (AO-26), Thiodipropionic acid dilauryl ester (Irganox$^R$ PS800), Distearyl thiodipropionate (Irganox$^R$ PS802), 2,2-Bis[[3-(dodecylthio)-1-oxopropoxy]methyl]propane-1,3-diyl bis[3-(dodecylthio)propionate] (AO-412S), ditridecyl 3,3'-thiodipropionate (AO-503)

Without being bound by any theory, an inner coating may contribute in protecting the bismuth oxy halide-based pigment such that the combination of an inner coating and an outer antioxidant coating synergistically results in higher heat resistance, in particular sufficient heat resistance for polyamide applications, and color stability. In addition, this combination may result in improved alkaline resistance, lightfastness (resistance to impact of sunlight) and weathering resistance in water based paints.

It is believed that EP2584009 mentioned in the background section lacks heat stability in polyamide because the absence of anti-oxidant results in absence of the synergistic effect of sufficient protection to heat treatment in polyamide applications.

The inner coating may be built of one or more salts, or one or more oxides, heteropolyacids, organic acids, sulphites, sulfides, sulfates, phosphates, pyrophosphates, polyphosphates, or a combination thereof, selected from the group of alkali-earth metals, metals, non-metals, transition metals or lanthanides. Preferably, one or more calcium salts or oxides, or one or more aluminum salts or oxides, or even more preferably a combination thereof may be selected. Aluminum salts or oxides in particular enhance QUV resistance, while calcium salts or oxides provide sufficient protection at low material costs.

In another embodiment in accordance with the present invention, the inner coating may be built of a plurality of layers. It may comprise a first layer comprising one or more salts, or one or more oxides, heteropolyacids, organic acids, sulphites, sulfides, sulfates, phosphates, pyrophosphates, polyphosphates, or a combination thereof, selected from the group of alkali-earth metals, metals, non-metals, transition metals or lanthanides, preferably one or more calcium salts or oxides, one or more aluminum salts or oxides, or a combination thereof, and a second layer of silicon dioxide and functionalized or organo modified silane. In addition, the inner coating may comprise a third layer comprising a functionalized silane or an organo modified siloxane or a combination thereof. Without being bound by any theory it is believed that the plurality of layers in the inner coating and the antioxidant in the outer coating generate a synergistic effect of protection to heat treatment, protection to weathering and acid rain (sulfur dioxide containing), and protection to chemicals, more specifically alkaline media. Preferably, the above mentioned first layer may be an outer layer of the inner coating and the second and third layer may be inner layers of the inner coating.

According to the present invention, the bismuth oxy halide-based pigment to be coated may be of the general formula BiOIaBrbClcFd, wherein a is a number from 0 to 1, preferably from 0.35 to 0.90, more preferably from 0.50 to 0.70; and wherein b is a number from 0 to 1, preferably from 0.10 to 0.65, more preferably from 0.30 to 0.50, wherein c is a number from 0 to 1, preferably from 0 to 0.4 wherein d is a number from 0 to 1, preferably from 0 to 0.4.

In addition, the bismuth oxy halide-based pigment to be coated may be of the general formula BiOnIaBrbClcFd, wherein a+b+c+d>0 and en n>=a+b+c+d.

Further, the bismuth oxy halide-based pigment to be coated may be mixed with bismuth vanadate, and/or may be of the formula: BiV(1−n)XnO(4−3n) with (n>0 and < or =to 1) with X being I, Br, Cl, or F or a combination thereof.

In addition, the bismuth oxy halide-based pigment to be coated may contain additional coating layers based on one or more salts, oxides, hydrates, (pyro)phosphates, silicates or carbonates of a non-exhaustive list of aluminium, silicium, titanium, calcium, rare earth metals or transition metals, one or more functionalized silanes or a combination thereof. The percentage of additional coating layers may be preferably between 0.1 and 30%. The additional coating on the bismuth oxy halide-based pigment to be coated may be beneficial for having a first level of stabilization of the basic pigment.

Another embodiment in accordance with the present invention provides a composition comprising a paint, a lacquer, an ink, a cosmetic, a resin, a polymer, or a plastisol and a coated bismuth oxy halide-based pigment as described in the foregoing paragraphs. Such composition may offer improved clean shade, color consistency and is less suffering from discoloration in the orange spectrum compared to the state of the art compositions.

More specifically, such composition may comprise polyamide and a coated bismuth oxy halide-based pigment as described in the foregoing paragraphs. As already stated above, colored, optionally glass fiber reinforced polyamide under heat treatment may show improved color stability by coloring it with a coated bismuth oxy halide-based pigment as described in the foregoing paragraphs.

Another more specific composition may comprise water based paint and a coated bismuth oxy halide-based pigment as described in the foregoing paragraphs. As already stated above as well, water based paint may show improved alkali resistance by coloring it with a coated bismuth oxy halide-based pigment as described in the foregoing paragraphs.

In addition, the present invention provides a method for manufacturing a coated bismuth oxy halide-based pigment as described in the foregoing paragraphs, said method comprising the steps of:
providing a dispersion of a bismuth oxy halide-based pigment,
adding a dispersion of an antioxidant,
mixing and drying.

By adding antioxidant in the stage of pigment production, the coated bismuth oxy halide-based pigment achieves suitable characteristics for being used in a diversity of applications as described above, such that different master batches for different types of applications may be produced without adding similar or equivalent additives in the master batch production stage.

In addition, against expectation it is surprisingly found that the efficiency of the antioxidant (e.g. the color stability under heat treatment) in the final consumer product is at least at comparable level by adding it in the stage of pigment production compared to adding it in the masterbatch.

The dispersion of antioxidant may be a dispersion of a phenol based, a phosphite or phosphonate based, or a thioether based stabilizer, or a combination thereof. Preferably, it may be a dispersion of an organic phosphite or phosphonite stabilizer prepared in the presence of one or more nonionic, cationic or anionic dispersing agents, or a combination thereof.

In an embodiment of a method according to the present invention, before adding the dispersion of antioxidant, a mixture one or more dissolved salts, or one or more oxides, heteropolyacids, organic acids, sulphites, sulfides, sulfates, phosphates, pyrophosphates, or a combination thereof, selected from the group of alkali-earth metals, metals, non-metals, transition metals or lanthanides may be added. By adding this mixture before adding the dispersion of antioxidant, an inner coating is formed before coating with antioxidant.

Preferably, the mixture is a mixture in water of calcium salts or oxides, and/or aluminum salts or oxides, and even more preferably a mixture of $CaCl_2 \cdot 2H_2O$ and $Al_2(SO_4)_3 \cdot xH_2O$.

The dispersion of a bismuth oxy halide-based pigment may be heated to a temperature in a range between 40° C. and boiling temperature, preferably between 70° and 99° C.

In an embodiment of a method according to the present invention, before adding the mixture of salts, or oxides or acids, etc., an amount of silicate solution and a first amount of functionalized silane may be added and the dispersion may be subsequently stirred while adding an amount of acid until a predetermined pH level between 1 to 5, preferably pH 2.5, is reached. Preferably, the added silane is of the general formula R—Si—(OR')3, wherein R is an alkyl group, preferably an alkyl group having from 1 to 22 carbon atom(s), an aryl group, or a combination thereof (being then said alkyl group substituted with at least one aryl group); or R is an alkyl group, preferably an alkyl group having from 1 to 16 carbon atom(s), this alkyl group being substituted with at least one electron donating group, preferably an alcohol group or an amino group; and R' is an alkyl group, preferably an alkyl group having from 1 to 3 carbon atom(s), or an aryl group. An example thereof is amino-3-propyltriethoxysilane (or 3-aminopropyltriethoxysilane).

In addition, a second amount of functionalized silane or an amount of organo modified siloxane or a combination thereof may be added, preferably after the predetermined pH level after adding the first amount of functionalized silane is added.

By adding the silicate solution and the functionalized silane, and optionally the second amount of functionalized silane in subsequent steps, an inner coating is formed built up from a number of different coating layers. As already stated above, it is believed that the plurality of layers in the inner coating and the antioxidant in the outer coating enhance protection to heat treatment (in particular for polyamide), protection to weathering and protection to chemicals, more specifically alkaline media.

In an embodiment of the present invention, before the step of filtering, washing, and drying the coated pigment, the pH may be adjusted between 5 and 9.

The oxy halide-based pigment to be coated in a method according to the present invention may be of the general formula $BiO_aI_aBr_bCl_cF_d$, wherein a is a number from 0 to 1, preferably from 0.35 to 0.90, more preferably from 0.50 to 0.70; and b is a number from 0 to 1, preferably from 0.10 to 0.65, more preferably from 0.30 to 0.50, wherein c is a number from 0 to 1, preferably from 0 to 0.4 and wherein d a number from 0 to 1, preferably from 0 to 0.4.

Further, the bismuth oxy halide-based pigment to be coated in a method according to the present invention may be of the general formula $BiO_nI_aBr_bCl_cF_d$, wherein a+b+c+d>0 and en n>=a+b+c+d.

In addition, the bismuth oxy halide-based pigment to be coated may be mixed with bismuth vanadate, and/or may be of the formula: $BiV(1-n)X_nO(4-3n)$ with (n>0 and < or =to 1) with X being I, Br, Cl, or F or a combination thereof.

EXAMPLES

For the examples described below, the commercially available bismuth oxyhalide-based pigment Lysopac Orange 6821B from Cappelle Pigments is taken as starting material. It is to be understood that the method of the present invention can or can also be applied to any other bismuth-based pigment.

Example 1

180 g of LYSOPAC ORANGE 6821B pigment is dispersed in 820 ml of water with 18.1 g of a 25% (by weight) silicate solution. The volume is then adjusted to 8600 ml by addition of a mixture of water and 1 g of sodium hydroxide and the temperature is raised to 90° C. (1° C./minute). 199.6 g of a 25% (by weight) sodium silicate ($Na_2SiO_3$) solution is diluted with water to a volume of 360 ml, and then added to the reactor over a time ranging from 30 minutes to 1 hour. 7.2 g amino-3-propyltriethoxysilane is then added, after which the pH is adjusted to 2.5 over 2.5 hours. 3.6 g amino-3-propyltriethoxysilane is then added to the reactor. A mixture of 16 g of an emulsion of an organomodified polysiloxane and 65 ml of water is added to the reactor. A mixture of 18.6 g calciumchloride ($CaCl_2 \cdot 2H_2O$) and 52.9 g of aluminiumsulphate ($Al_2(SO_4)_3 \cdot xH_2O$ calculated as 17% in weight $Al_2O_3$) in 275 ml of water is added to the reactor and stirred for at least 5 minutes. A dispersion of 14.4 g of Tris(2,4-tert-butylphenyl) Phosphite is prepared in the presence of 0.86 g of a non-ionic surfactant (ethoxylated alcohol) in 130 ml of water, and added to the reactor. The reactor is stirred for 5 minutes, and then the pH is adjusted to 7.2 with a 20% (by weight) sodium carbonate (Na2CO3) solution. 275.5 g reddish orange pigment is obtained after filtration, washing, and drying.

Example 2

180 g of LYSOPAC ORANGE 6821B pigment is dispersed in 820 ml of water with 18.1 g of a 25% (by weight) silicate solution. The volume is then adjusted to 8600 ml by addition of a mixture of water and 1 g of sodium hydroxide and the temperature is raised to 90° C. (1° C./minute). 199.6 g of a 25% (by weight) sodium silicate (Na2SiO3) solution is diluted with water to a volume of 360 ml, and then added to the reactor over a time ranging from 30 minutes to 1 hour. 7.2 g amino-3-propyltriethoxysilane is then added, after which the pH is adjusted to 2.5 over 2.5 hours. 3.6 g amino-3-propyltriethoxysilane is then added to the reactor. A mixture of 16 g of an emulsion of an organomodified polysiloxane and 65 ml of water is added to the reactor. A mixture of 18.6 g calciumchloride (CaCl2.2H2O) and 52.9 g of aluminiumsulphate (Al2(SO4)3.xH2O calculated as 17% in weight Al2O3) in 275 ml of water is added to the reactor and stirred for at least 5 minutes. A dispersion of 7.2 g of Tris(2,4-tert-butylphenyl) Phosphite and 7.2 g of octadecyl 3-(3,5-ditert-butyl-4-hydroxyphenyl)propanoate is prepared in the presence of 0.86 g of a non-ionic surfactant (ethoxylated alcohol) in 130 ml of water, and added to the reactor. The reactor is stirred for 5 minutes, and then the pH is adjusted to 7.2 with a 20% (by weight) sodium carbonate (Na2CO3) solution. 270.8 g reddish orange pigment is obtained after filtration, washing, and drying.

Example 3 (Comparative Example)

180 g of LYSOPAC ORANGE 6821B pigment is dispersed in 820 ml of water with 18.1 g of a 25% (by weight) silicate solution. The volume is then adjusted to 8600 ml by addition of a mixture of water and 1 g of sodium hydroxide and the temperature is raised to 90° C. (1° C./minute). 199.6 g of a 25% (by weight) sodium silicate (Na2SiO3) solution is diluted with water to a volume of 360 ml, and then added to the reactor over a time ranging from 30 minutes to 1 hour. 7.2 g amino-3-propyltriethoxysilane is then added, after which the pH is adjusted to 2.5 over 2.5 hours. 3.6 g amino-3-propyltriethoxysilane is then added to the reactor. A mixture of 18.6 g calciumchloride (CaCl2.2H2O) and 52.9 g of aluminiumsulphate (Al2(SO4)3.xH2O calculated as 17% in weight Al2O3) in 275 ml of water is added to the reactor and stirred for at least 5 minutes. A dispersion of 14.4 g of Tris(2,4-tert-intbutylphenyl) Phosphite is prepared in the presence of 0.86 g of a non-ionic surfactant (ethoxylated alcohol) in 130 ml of water, and added to the reactor. The reactor is stirred for 5 minutes, and then the pH is adjusted to 7.2 with a 20% (by weight) sodium carbonate (Na2CO3) solution. 269.1 g reddish orange pigment is obtained after filtration, washing, and drying.

Example 4 (Comparative Example)

180 g of LYSOPAC ORANGE 6821B pigment is dispersed in 820 ml of water with 18.1 g of a 25% (by weight) silicate solution. The volume is then adjusted to 8600 ml by addition of a mixture of water and 1 g of sodium hydroxide and the temperature is raised to 90° C. (1° C./minute). 199.6 g of a 25% (by weight) sodium silicate (Na2SiO3) solution is diluted with water to a volume of 360 ml, and then added to the reactor over a time ranging from 30 minutes to 1 hour. 7.2 g amino-3-propyltriethoxysilane is then added, after which the pH is adjusted to 2.5 over 2.5 hours. 3.6 g amino-3-propyltriethoxysilane is then added to the reactor. A mixture of 16 g of an emulsion of an organomodified polysiloxane and 65 ml of water is added to the reactor. A dispersion of 14.4 g of Tris(2,4-tert-butylphenyl) Phosphite is prepared in the presence of 0.86 g of a non-ionic surfactant (ethoxylated alcohol) in 130 ml of water, and added to the reactor. The reactor is stirred for 5 minutes, and then the pH is adjusted to 7.2 with a 20% (by weight) sodium carbonate (Na2CO3) solution. 256.8 g reddish orange pigment is obtained after filtration, washing, and drying.

Example 5 (Comparative Example)

180 g of LYSOPAC ORANGE 6821B pigment is dispersed in 820 ml of water with 18.1 g of a 25% (by weight) silicate solution. The volume is then adjusted to 8600 ml by addition of a mixture of water and 1 g of sodium hydroxide and the temperature is raised to 90° C. (1° C./minute). 199.6 g of a 25% (by weight) sodium silicate (Na2SiO3) solution is diluted with water to a volume of 360 ml, and then added to the reactor over a time ranging from 30 minutes to 1 hour. 7.2 g amino-3-propyltriethoxysilane is then added, after which the pH is adjusted to 2.5 over 2.5 hours. 3.6 g amino-3-propyltriethoxysilane is then added to the reactor. A mixture of 16 g of an emulsion of an organomodified polysiloxane and 65 ml of water is added to the reactor. A mixture of 18.6 g calciumchloride (CaCl2.2H2O) and 52.9 g of aluminiumsulphate (Al2(SO4)3.xH2O calculated as 17% in weight Al2O3) in 275 ml of water is added to the reactor and stirred for at least 5 minutes. Then the pH is adjusted to 7.2 with a 20% (by weight) sodium carbonate (Na2CO3) solution. 264.5 g reddish orange pigment is obtained after filtration, washing, and drying.

Example 6 (Comparative Example)

180 g of LYSOPAC ORANGE 6821B pigment is dispersed in 820 ml of water with 18.1 g of a 25% (by weight) silicate solution. The volume is then adjusted to 8600 ml by addition of a mixture of water and 1 g of sodium hydroxide and the temperature is raised to 90° C. (1° C./minute). The pH is adjusted to 2.5 over 2.5 hours. A mixture of 18.6 g calciumchloride (CaCl2.2H2O) and 52.9 g of aluminiumsulphate (Al2(SO4)3.xH2O calculated as 17% in weight Al2O3) in 275 ml of water is added to the reactor and stirred for at least 5 minutes. A dispersion of 14.4 g of Tris(2,4-tert-butylphenyl) Phosphite is prepared in the presence of 0.86 g of a non-ionic surfactant (ethoxylated alcohol) in 130 ml of water, and added to the reactor. The reactor is stirred for 5 minutes, and then the pH is adjusted (neutralized) to 7.2 with a 20% (by weight) sodium carbonate (Na2CO3) solution. 214.2 g reddish orange pigment is obtained after filtration, washing, and drying.

Example 7 (Comparative Example)

180 g of LYSOPAC ORANGE 6821B pigment is dispersed in 820 ml of water with 18.1 g of a 25% (by weight) silicate solution. The volume is then adjusted to 8600 ml by addition of a mixture of water and 1 g of sodium hydroxide and the temperature is raised to 90° C. (1° C./minute). The pH is adjusted to 2.5 over 2.5 hours. A mixture of 16 g Of an emulsion of an organomodified polysiloxane and 65 ml of water is added to the reactor. A mixture of 18.6 g calciumchloride (CaCl2.2H2O) and 52.9 g of aluminiumsulphate (Al2(SO4)3.xH2O calculated as 17% in weight Al2O3) in 275 ml of water is added to the reactor and stirred for at least 5 minutes. A dispersion of 14.4 g of Tris(2,4-tert-butylphenyl) Phosphite is prepared in the presence of 0.86 g of a non-ionic surfactant (ethoxylated alcohol) in 130 ml of water, and added to the reactor. The reactor is stirred for 5 minutes, and then the pH is adjusted to 7.2 with a 20% (by weight) sodium carbonate (Na2CO3) solution. 207.3 g reddish orange pigment is obtained after filtration, washing, and drying.

Example 8 (Comparative Example)

400 g of LYSOPAC ORANGE 6821B pigment and 20.8 g of Tris(2,4-tert-butylphenyl) Phosphite are mixed in a dry blend.

Example 9 (Comparative Example)

400 g of LYSOPAC ORANGE 6821B pigment and 32 g of Tris(2,4-tert-butylphenyl) Phosphite are mixed in a dry blend.

Example 10

Control method of coated bismuth oxyhalide pigment in polyamide and results:

Production of a masterbatch: The coated bismuth oxyhalide pigment is premixed with a modified poly(ethylene/acrylic acid) copolymer (specifically Aclyn 295A, Honeywell) at 60% pigment loading for 5'. The premix is fed to the hopper of a co-rotating double screw extruder (ZK25 Collin) at a temperature of 120° C. at 100 rpm. Finally the pelletized masterbatch is dried in an oven at 50° C. for 2 hours.

Dilution of the masterbatch with polyamide-6: the above-mentioned masterbatch is admixed with polyamide (Akulon K222D, DSM) to a pigment concentration of 0.5% by weight. The mix is poured into the hopper and extruded by means of a single screw extruder (Collin Teach-Line E20T) at temperature-zones 235° C.-235° C.-235° C.-225° C., followed by granulation. The final granulated plastic compound at 0.5% pigment loading is dried in an oven at 75° for at least 16 hours.

Evaluation of coloristic properties and heat resistance: 20 plates are produced by injection moulding of the abovementioned plastic compound in a matrix (thickness 2 mm) on a BOY 22S Dipronic at 240° C. for 30 seconds, of which the final plate is used as reference to measure coloristic values. Temperature is increased in increments of 10° C. at 5 minutes dwell time. CIELa*b* coloristic values are measured against the reference of 30 seconds 240° C. to evaluate the heat resistance.

SO2 resistance in plastics: the injected plates in PA6 at 0.5% pigment concentration are exposed in the Kesternich device (CON 300-FL AIR CWC AWRF KE) with an automated SO2 dosage (DosiCORR). Procedure is according to DIN50018 (testing in a saturated atmosphere in the presence of sulfur dioxide). Test is performed for 3/6/9 cycles.

Table 1 summarizes the heat resistance in Akulon K222D (0.5% pigment loading)—reference: 30" 240°, result as DE value.

TABLE 1

| Example | 5'240 | 5' 250 | 5' 260 | 5' 270 | 5' 280 | 5' 290 | 5' 300 |
|---|---|---|---|---|---|---|---|
| 6821B | 4.49 | 5.89 | 8.19 | 10.41 | 12.58 | 15.58 | 20.08 |
| 1 | 1.61 | 2.3 | 2.85 | 3.66 | 4.32 | 5.11 | 6.76 |
| 2 | 1.35 | 1.76 | 1.95 | 2.36 | 3.11 | 4.4 | 6.35 |
| 3 | 2.62 | 3.95 | 5.06 | 6.46 | 8.19 | 9.41 | 11.26 |
| 4 | 1.36 | 2.28 | 3.16 | 4.07 | 5.31 | 6.57 | 8.64 |
| 5 | 1.61 | 2.67 | 4.15 | 6.09 | 8.24 | 11.13 | 14.53 |
| 6 | 3.97 | 5.87 | 7.32 | 9.18 | 11.44 | 13.92 | 17.28 |
| 7 | 4.91 | 6.92 | 6.46 | 8.29 | 10.74 | 13.36 | 16.36 |
| 8 | 3.13 | 3.6 | 3.62 | 3.7 | 4.39 | 5.58 | 7.35 |
| 9 | 2.37 | 2.65 | 2.63 | 2.85 | 3.63 | 4.87 | 7.24 |

Table 2 summarizes the coloristic assessment at 30"240° in Akulon K222D (0.5% pigment loading)—reference: pigment LYSOPAC ORANGE 6821B.

TABLE 2

| Example | DE | DL | DC | DH |
|---|---|---|---|---|
| 6821B | | Reference | | |
| 1 | 4.59 | 2.83 | 3.59 | −0.42 |
| 2 | 4.21 | 2.57 | 3.32 | −0.33 |
| 3 | 2.19 | 1.71 | 1.37 | 0.03 |
| 4 | 3.78 | 2.38 | 2.93 | −0.3 |
| 5 | 3.46 | 1.9 | 2.82 | −0.66 |
| 6 | 4.35 | −0.19 | −3.97 | 1.76 |
| 7 | 2.75 | 0.02 | −2.57 | 0.97 |
| 8 | 0.84 | −0.03 | −0.47 | 0.69 |
| 9 | 1.02 | 0.43 | 0.83 | 0.4 |

Table 3 summarizes the chemical resistance in Akulon K222D (0.5% pigment loading) (SO2-resistance after 9 days)—reference: 30"240°, result as DE value.

TABLE 3

| Example | DE - 9 days |
|---|---|
| 6821B | 9.46 |
| 1 | 1.3 |
| 2 | 1.26 |
| 3 | 2.49 |
| 4 | 1.75 |
| 5 | 1.59 |
| 6 | 12.88 |
| 7 | 12.12 |
| 8 | 10.94 |
| 9 | 11.69 |

Example 11

Water Based Paint Preparation Mill Base: 60% Pigment 15 g dispersing agent Dysperbyk 190 with 40% active matter
24.5 g Reverse-Osmose water (RO-water)
0.5 g Byk 420 with 52% active matter
60 g of the said pigment e.g. LYSOPAC ORANGE 6821B pigment, prepared according to the procedure of the examples described above
100 g of glass beads of diameter 2 mm The ingredients are weighted in a glass bottle and the samples are milled for 60 minutes, and left 15 minutes at ambient temperature before further processing.

White Paint: 25% Pigment

The white emulsion paint of 25% pigment loading is prepared according the formulation below by using a laboratory dissolver Dispermat from Getzmann in a 2000 mL metal bottle. The fineness of the final paint (measured by a Hegman gauge) should be below 20 µm.

241.87 g RO-water
0.63 g Calgon® N Neu
3.25 g pigment verteiler A
3.00 g Borchi Gen DFN
3.75 g agitan 218

The ingredients are mixed in a lab dissolver, adding then the following ingredients:
250.00 g TiO2 CL 2310 (Kronos)
62.50 g Finn Talc The ingredients are dispersed for 10 minutes at 10 m/s and the following ingredients are added under slow stirring:
17.50 g NX-795
6.25 g rheoloate 278
412.50 g acronal 290D (50%)

Finally the ingredients are mixed during 10 minutes in the dissolver.

Reduced Shade 1/10 TiO 2 and Drawdowns

A reduced shade is prepared by weighing, in a plastic beaker of 125 ml, 0.83 g of the mill base and 20.00 g of the white paint (coating) described above, and homogenizing it with the speed mixer DAC 150.1 FVZ for 1 minute.

The homogenized reduced shade is manually applied on LENETA black/white contrast paper by means of bar coater N°8 (wet film thickness 100 µm). The drawdowns are dried for 24 hours at ambient temperature.

The resulting coatings (reduced shade) can coloristically be evaluated with a spectrophotometer Minolta CM3600d using a measuring angle of 10° and standard illuminant D65 to determine the CIELAB colorimetric characterizations (CIELAB color values) ΔE-ΔL-ΔC-ΔH before and after correction.

Rheological behavior: the water based paint at 60% pigment concentration is stabilized for min. 12 hours at 25° C. Before testing, recipients are homogenized on the speed mixer DAC 150.1 FVZ for 1.5 minutes. Test equipment: rheolab QC with a measuring cylinder Z3DIN. Result is the viscosity at 200/s.

Table 4 summarizes the rheoloqy of the mill base at 60% pigment loading—Result in Pascal, measured at 200/s.

TABLE 4

| Example | T |
|---|---|
| 6821B | 6.21 |
| 1 | 16.40 |
| 2 | 16.52 |
| 3 | 17.31 |
| 4 | 79.79 |
| 5 | 15.13 |
| 6 | 12.18 |
| 7 | 12.34 |
| 8 | 8.06 |
| 9 | 8.72 |

Example 12

Alkalinity Resistance

The reduced shade prepared in the example 11 is applied on aluminum panels (2 panels per pigment sample) manually using the bar coater N°8 (wet film 100 µm). After 30 minutes drying in the oven (at 50° C.) and additional 24 hours drying at ambient temperature, the half of the 2 painted panels are immersed for 24 hours in two different solutions 1/ a solution of 25% K2CO3 and 2/ a solution of 5% of NaOH. The exposed surface will be rinsed with tap water and kept at ambient temperature until complete drying (i.e. for 2 to 3 hours).

The color deviation between immersed and non-immersed surface of the same panel can visually and colorimetrically (see example 11) be evaluated to judge the alkaline stability of the pigment.

The difference in color strength is due to the degradation of the pigment by the basic solution. The highest is the color strength compared to the non-immersed part of the panel, the best is the alkaline resistance.

The results are compared only with samples tested in the same conditions (same day, same solution, same drying).

Table 5 summarizes the coloring strength (CS) of the pigments after being exposed for 24 hours to 1/ a solution of K2CO3 2/ a solution of NaOH—reference: non-exposed part.

TABLE 5

| Example | CS % 24 H 25% K2CO3 | CS % 24 H 5% NaOH |
|---|---|---|
| 6821B | 50.7 | 51.82 |
| 1 | 75.18 | 77.53 |
| 2 | 72.44 | 71.34 |
| 3 | 76.54 | 74.61 |
| 4 | Not available | Not available |
| 5 | 75.13 | 71.89 |
| 6 | 57.75 | 51.03 |
| 7 | 66.86 | 58.03 |
| 8 | 53.34 | 47.35 |
| 9 | 54.28 | 49.40 |

Example 13

Weathering Resistance

The reduced shade prepared in the example 11 is applied on aluminum panels manually using the bar coater N°8 (wet film 100 µm). After 30 minutes drying in the oven (at 50° C.) and additional 24 hours drying at ambient temperature, the panels are introduced in the Weather-O-Meter Ci4000. Testing according to G-26(A) for 1000 hours.

Table 6 summarizes the accelerated weathering results of the pigments after being exposed for 1000 Hours—colористic result as DE value.

TABLE 6

| Example | DE - 1000 H |
|---|---|
| 6821B | 2.72 |
| 1 | 1.36 |
| 2 | 1.46 |
| 3 | 1.25 |
| 4 | Not available |
| 5 | Not available |
| 6 | 1.92 |
| 7 | 1.70 |
| 8 | 2.18 |
| 9 | 2.20 |

Summarized: Comparative examples 8 and 9 show that the addition of the antioxidant only is not an acceptable solution because the heat resistance is improved but at the expense of the purity of the shade, which is well known to be a decisive parameters for pigment formulators.

The invention claimed is:

1. A coated bismuth oxy halide-based pigment having a coating comprising
an antioxidant, said antioxidant being a phenol based, a phosphite or phosphonate based, or a thioether based stabilizer, and
said coating comprising an inner coating and an outer coating,
wherein the outer coating comprises the antioxidant, and
wherein the inner coating comprises a first layer consisting of one or more salts, or one or more oxides, heteropolyacids, organic acids, sulphites, sulfides, sulfates, phosphates, pyrophosphates, polyphosphates, hydrates, carbonates, or a combination thereof, selected from the group of alkali-earth metals, non-metals, transition metals or lanthanides,
wherein the inner coating comprises a second layer comprising silicon dioxide and functionalized silane,
wherein the functionalized silane is of a general formula R—Si—(OR')$_3$, wherein R is an alkyl group, an aryl group, or a combination thereof being then said alkyl group substituted with at least one aryl group; or R is an alkyl group being substituted with at least one electron donating group; and R' is an alkyl group or an aryl group, and
wherein the first layer comprises an outer layer of the inner coating, and the second layer comprises an inner layer of the inner coating.

2. The coated bismuth oxy halide-based pigment according to claim 1, of a general formula BiOlaBrbClcFd, wherein a, b, c, d are numbers from 0 to 1 and wherein a+b+c+d>0.

3. The coated bismuth oxy halide-based pigment according to claim 1, wherein the bismuth oxy halide-based pigment to be coated is of a general formula BiOn-laBrbClcFd, wherein a+b+c+d>0 and n>=a+b+c+d.

4. The coated bismuth oxy halide-based pigment according to claim 1, wherein the bismuth oxy halide-based pigment to be coated is mixed with bismuth vanadate having a formula BiV$_{(1-n)}$XnO$_{(4-3n)}$ with 0<n≤1 and X being I, Br, Cl or F or a combination thereof.

5. The coated bismuth oxy halide-based pigment according to claim 1, wherein the bismuth oxy halide pigment to be coated contains additional coating layers based on one or more salts, or one or more oxides, or one or more heteropolyacids, organic acids, or one or more sulphites, sulfides, sulfates, phosphates, pyrophosphates, polyphosphates, hydrates, carbonates, or a combination thereof, selected from the group of alkali-earth metals, non-metals, transition metals or lanthanides, one or more functionalized or organo modified silane, organo modified siloxane, or a combination thereof.

6. A composition comprising a paint, a lacquer, an ink, a cosmetic, a resin, a plastisol or a polymer formulation, or a pigment paste concentration and, the composition comprises the coated bismuth oxy halide-based pigment according to claim 1.

7. A composition comprising polyamide and the coated bismuth oxy halide-based pigment according to claim 1.

8. A composition comprising water based paint and the coated bismuth oxy halide-based pigment according to claim 1.

9. A method for manufacturing the coated bismuth oxy halide-based pigment according to claim 1, said method comprising the steps of:
adding a mixture of one or more salts, or one or more oxides, heteropolvacids, organic acids, sulphites, sulfides, sulfates, phosphates, pyrophosphates, polyphosphates, hydrates, carbonates, or a combination thereof, selected from the group of alkali-earth metals, non-metals, transition metals or lanthanides,
adding, before adding the mixture, an amount of silicate solution and a first amount of functionalized silane and stirring the dispersion while adding an amount of acid,
providing a dispersion of the bismuth oxy halide-based pigment of claim 1, adding a dispersion of an antioxidant,
mixing and drying.

10. The method according to claim 9, further comprising the steps of adding, before adding the mixture, a second amount of functionalized silane or an amount of organo modified siloxane or a combination thereof.

11. The coated bismuth oxy halide-based pigment of claim 1, wherein the inner coating further comprises a third layer comprising a functionalized silane or an organo modified siloxane or a combination thereof.

12. The method of claim 9, wherein the step of adding the mixture is performed before adding the dispersion of antioxidant.

* * * * *